US011344479B2

(12) United States Patent
Campbell et al.

(10) Patent No.: US 11,344,479 B2
(45) Date of Patent: May 31, 2022

(54) PUMP-ACTIVATED FEEDING CONTAINER

(71) Applicants: Bryan Campbell, Plantation, FL (US); Olympia Campbell, Plantation, FL (US)

(72) Inventors: Bryan Campbell, Plantation, FL (US); Olympia Campbell, Plantation, FL (US)

(*) Notice: Subject to any disclaimer, the term of this patent is extended or adjusted under 35 U.S.C. 154(b) by 304 days.

(21) Appl. No.: 16/642,017

(22) PCT Filed: Oct. 7, 2019

(86) PCT No.: PCT/US2019/055056
§ 371 (c)(1),
(2) Date: Feb. 25, 2020

(87) PCT Pub. No.: WO2020/073053
PCT Pub. Date: Apr. 9, 2020

(65) Prior Publication Data

US 2020/0237624 A1 Jul. 30, 2020

Related U.S. Application Data

(60) Provisional application No. 62/742,090, filed on Oct. 5, 2018.

(51) Int. Cl.

| | |
|---|---|
| ***F16M 11/00*** | (2006.01) |
| ***A61J 11/00*** | (2006.01) |
| ***A61J 9/06*** | (2006.01) |
| ***A61J 9/00*** | (2006.01) |

(52) U.S. Cl.
CPC ............. *A61J 11/002* (2013.01); *A61J 9/006* (2013.01); *A61J 9/0623* (2015.05); *A61J 9/0669* (2015.05)

(58) Field of Classification Search
CPC ...... A61J 11/002; A61J 9/0623; A61J 9/0669; A61J 9/006
See application file for complete search history.

(56) References Cited

U.S. PATENT DOCUMENTS

| | | | | |
|---|---|---|---|---|
| 4,196,747 | A | 4/1980 | Quigley et al. | |
| 4,607,755 | A * | 8/1986 | Andreozzi ......... | A47G 19/2266 220/717 |
| 5,361,987 | A | 11/1994 | Matheussen et al. | |
| 5,460,161 | A | 10/1995 | Englehart et al. | |
| 5,662,268 | A | 9/1997 | Katzenberger | |
| 5,728,137 | A | 3/1998 | Anderson-Fignon | |

(Continued)

*Primary Examiner* — Amy J. Sterling
(74) *Attorney, Agent, or Firm* — Mark C. Johnson; Johnson Dalal

(57) ABSTRACT

A pump-activated feeding container having a handheld container body with a removable top and a flexible straw assembly disposed within the body and exposed outside of the body. The container includes a priming bulb pump assembly directly coupled to at least one of the container body and container top in a watertight configuration and with a flexible and elastically deformable membrane defining a membrane cavity. The membrane is operably configured to have a membrane depression translation path 306 inducing a pressurized flow of liquid through a second enclosed straw channel of the straw assembly and an upper straw opening and to have a membrane release translation path 400 inducing a vacuum and flow of liquid through a first enclosed straw channel of the straw assembly and an upper straw opening.

18 Claims, 5 Drawing Sheets

(56) References Cited

U.S. PATENT DOCUMENTS

| | | | | |
|---|---|---|---|---|
| 6,923,332 | B1 | 8/2005 | Thomas | |
| 7,918,370 | B2 | 4/2011 | Yeh et al. | |
| 11,166,575 | B2 * | 11/2021 | Richard ............. | A47G 19/2266 |
| 2009/0071982 | A1 | 3/2009 | Lesfargues | |
| 2015/0102029 | A1 * | 4/2015 | Bargiel .............. | A47G 19/2272<br>220/709 |
| 2015/0305528 | A1 * | 10/2015 | Chen .................. | A47G 19/2266<br>220/666 |
| 2018/0050847 | A1 * | 2/2018 | Herling .............. | A47G 19/2266 |

* cited by examiner

PUMP-ACTIVATED FEEDING CONTAINER

CROSS-REFERENCE TO RELATED APPLICATION

This application is a national stage filing of International Application Number PCT/US19/55056, filed Oct. 7, 2109, which claims priority to pending U.S. Provisional Patent Application No. 62/742,090, filed Oct. 5, 2018, the entirety of which is incorporated herein by reference.

FIELD OF THE INVENTION

The present invention relates generally to portable feeding containers, and, more particularly, relates to handheld, portable, and pump-activated feeding containers. Pump

BACKGROUND OF THE INVENTION

Many individuals need or desire to feed or provide liquid to themselves or others in an effective, efficient, and safe manner. This is particularly true for young children, the elderly, and disabled individuals. Traditional methods of effectuating feeding or providing liquid to users include employing the use of utensils. These traditional methods are problematic because many users are unable to effectively and safely receive the feeding portion of the utensil or said feeding process is a messy endeavor.

Some known devices and methods have been developed to address the aforementioned issues. One device includes employing the use of an open container with a drinking conduit fluidly coupled to a check valve, as exemplified in U.S. Pat. No. 4,196,747 issued to Quigley et al. Devices such as these, however, are still problematic. For example, these devices require suction by the user in order to create the impetus to generate fluid flow within the drinking conduit, which many users are unable to do. Additionally, these devices also are difficult to hold and manage by a user, particularly with a single hand of the user. Further, many of these devices also fail to provide a user a quick and effective means to generate fluid flow within the drinking conduit.

Therefore, a need exists to overcome the problems with the prior art as discussed above.

SUMMARY OF THE INVENTION

The invention provides a pump-activated feeding assembly that overcomes the hereinafore-mentioned disadvantages of the heretofore-known devices and methods of this general type and that is operable to effectively and efficiently feed or supply liquid to a user.

With the foregoing and other objects in view, there is provided, in accordance with the invention, a pump-activated feeding container having a handheld container body having a bottom wall and a sidewall surrounding the bottom wall. The sidewall includes an upper end defining an upper aperture and defines, with the bottom wall, a container cavity. The assembly also includes a container top operably configured to removably couple with the upper end of the sidewall in a retained configuration, wherein the container top has an enclosed straw aperture. The pump-activated feeding container also includes a flexible straw assembly with a first portion including bottom straw end defining a bottom straw opening disposed proximal to the bottom wall of the container body and defining a first enclosed straw channel. The straw assembly also includes a second portion including a terminal upper straw end, opposing the bottom straw end, defining an upper straw opening disposed proximal to an outer surface of the container top, and defining a second enclosed straw channel. The pump-activated feeding container also includes a priming bulb pump assembly directly coupled to either the container body or container top in a watertight configuration and with a flexible and elastically deformable membrane defining a membrane cavity. The membrane is operably configured to have a membrane depression translation path inducing a pressurized flow of liquid through the second enclosed straw channel and the upper straw opening and to have a membrane release translation path inducing a vacuum and flow of liquid through the first enclosed straw channel and the upper straw opening.

In accordance with a further feature of the present invention, the membrane depression translation path solely induces the pressurized flow of liquid through the second enclosed straw channel and the upper straw opening and the membrane release translation path solely induces the vacuum and flow of liquid through the first enclosed straw channel.

In accordance with another feature, an embodiment of the present invention also includes the housing having an entrance port and an exit port, wherein the membrane depression translation path includes the membrane cavity, the exit port, the enclosed straw aperture, the second enclosed straw channel, and the terminal upper straw end fluidly coupled with one another and includes the enclosed straw aperture fluidly uncoupled with the first enclosed straw channel, the bottom straw opening, and the container cavity.

In accordance with a further feature of the present invention, the membrane release translation path includes with the membrane cavity, the entrance port, the first enclosed straw channel, the bottom straw opening, and the container cavity fluidly coupled with one another and the membrane cavity fluidly uncoupled with the enclosed straw aperture, the second enclosed straw channel, and the terminal upper straw end.

In accordance with yet another feature, an embodiment of the present invention also includes a first one-way check valve at least partially disposed within the first enclosed straw channel and a second one-way check valve at least partially disposed within the second enclosed straw channel.

In accordance with an exemplary feature of the present invention, the first and second one-way check valves are coupled to the first portion and second portion, respectively, of the flexible straw assembly in parallel flow orientations.

In accordance with yet another feature, an embodiment of the present invention also includes the priming bulb pump assembly also having a housing defining a front enclosed aperture, the flexible and elastically deformable membrane hermetically sealed to the housing and superimposing the front enclosed aperture.

In accordance with a further feature, an embodiment of the present invention also includes the container top having a sidewall defining an enclosed bulb aperture with the housing disposed therein, a lower wall defining a first port aperture and a second port aperture shaped and sized to receive an entrance port and an exit port, respectively, of a housing of the priming bulb pump assembly, and a straw channel with the second portion disposed therein.

In accordance with another feature, an embodiment of the present invention also includes a cover selectively rotatably coupled to the container top and operably configured to rotate along a cover translation path and have a closed position encapsulating, with the container top, the membrane and the second portion of the flexible straw assembly and an open position along the cover translation path exposing the membrane and the second portion of the flexible straw assembly to the ambient environment.

In accordance with the present invention, a pump-activated feeding container includes a handheld container body having a bottom wall and a sidewall surrounding the bottom wall and having an upper end defining an upper aperture and with sidewall threads disposed thereon, wherein the sidewall and bottom wall defines a container cavity. The assembly also includes a container top with top threads operably configured to selectively removably engage in a locked relationship with the sidewall threads, the container top having an enclosed straw aperture. The assembly also includes a flexible straw assembly with a first portion including bottom straw end defining a bottom straw opening and defining a first enclosed straw channel and a second portion including a terminal upper straw end, opposing the bottom straw end, defining an upper straw opening and defining a second enclosed straw channel. Additionally, the assembly may include a first one-way check valve and a second one-way check valve. Also, a priming bulb pump assembly may employed and be directly coupled to at least one of the container body and container top in a watertight configuration, with an entrance port directly coupled to the first portion of the flexible straw assembly through the first one-way check valve, an exit port directly coupled to the second portion of the flexible straw assembly through the second one-way check valve, and a flexible and elastically deformable membrane defining a membrane cavity. The membrane 114 operably configured to have a membrane depression translation path inducing a pressurized flow of liquid through the second enclosed straw channel and the upper straw opening and to have a membrane release translation path inducing a vacuum and flow of liquid through the first enclosed straw channel and the upper straw opening.

In accordance with an exemplary feature of the present invention, the bottom straw opening is disposed proximal to the bottom wall of the container body and the upper straw opening is disposed proximal to an outer surface of the container top.

Although the invention is illustrated and described herein as embodied in a pump-activated feeding assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the container spanning in a direction from the bottom of the container to the top of the container.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
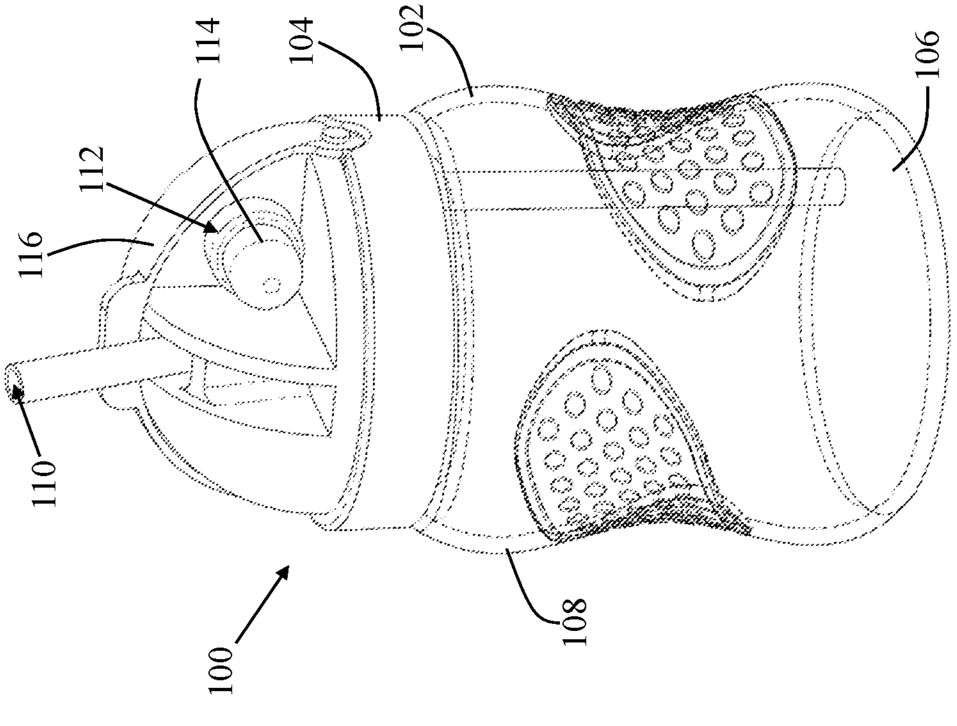
FIG. 1 is a perspective view of a pump-activated feeding assembly in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention described herein provides a pump-activated feeding container that overcomes known disadvantages of those known devices and methods of this general type and that is operably configured to selectively emit a liquid from inside a container. This container beneficially permits a user to facilitate in the feeding process of a child, a disabled individual, and/or other purposes and applications. Although the invention is illustrated and described herein as embodied in a pump-activated feeding container, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Figure 6:
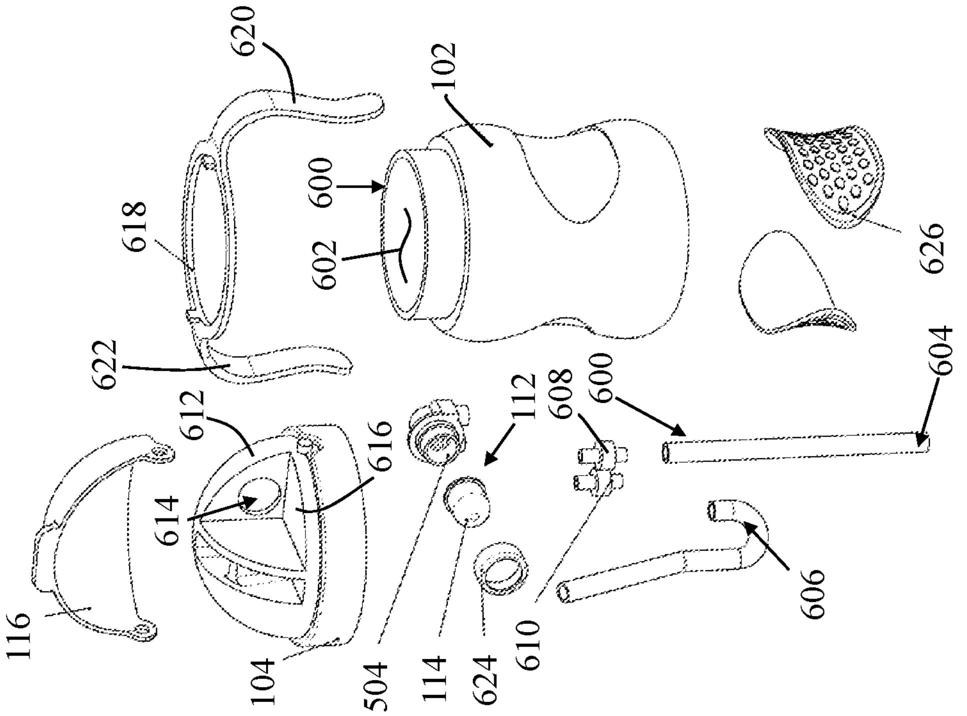
FIG. 6 is an exploded view of the pump-activated feeding assembly depicted in FIG. 1.

Referring now to FIG. 1, one embodiment of the present invention is shown in a perspective view. FIG. 1, along with the other figures, show several advantageous features of the present invention, but, as will be described below, the invention can be provided in several shapes, sizes, combinations of features and components, and varying numbers and functions of the components. The first example of a pump-activated feeding assembly 100, as shown in FIG. 1, includes a handheld container body 102, a container top 104, and a cover 116. As seen in FIG. 1 and FIG. 6, the assembly 100 may also include a handle 618 with two opposing handle portions 620, 622 and annular center aperture shaped and sized to receive an upper end of the container body 102 or the container top 104. The container body 102, a container top 104, and a cover 116 may be of a substantially rigid material, e.g., a polymeric material such as high-density polyethylene (HDPE).

Figure 2:
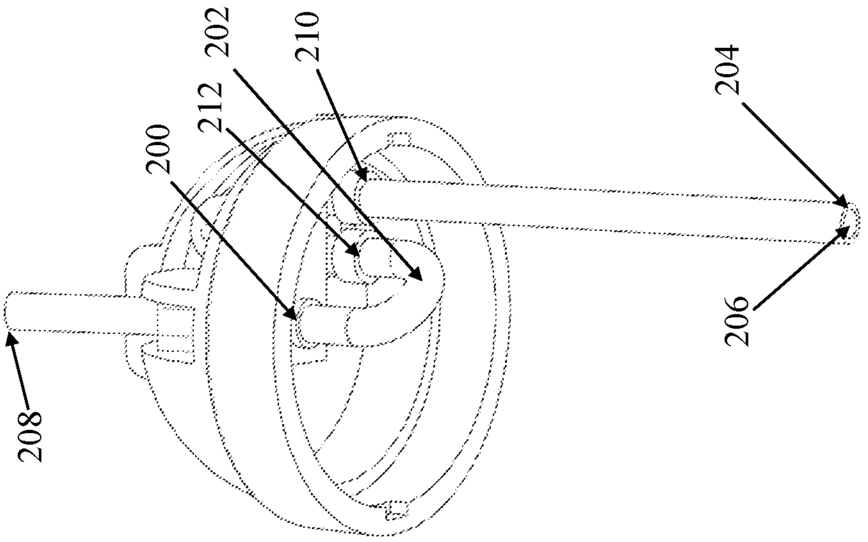
FIG. 2 is a perspective upward-looking view of a container top of the pump-activated feeding assembly depicted in FIG. 1.

With reference now to FIGS. 1-2 and FIG. 6, the container assembly 100 also includes a flexible straw assembly 202 and a priming bulb pump assembly 112 directly coupled to either the container body 102 or the container top 104 in a watertight configuration (although the figures depict the priming bulb pump assembly 112 directly coupled to the container body 102). Beneficially, a flexible and elastically deformable membrane 114 of the priming bulb pump assembly 112 is operably configured to induce a vacuum and pressure through the flexible straw assembly 202.

The container assembly 100 includes a bottom wall 106 and a sidewall 108 surrounding the bottom wall 106, wherein the sidewall 108 and bottom wall 106 define a container cavity 500 (shown best in FIG. 5) sized to hold a liquid substance, e.g., baby food, formula, water, and other liquid-based substances (sometimes referred to herein as a fluid). The sidewall 108 includes an upper end 600 (which may be the terminal end) defining an upper aperture 602 to provide access to the container cavity 500. The container top 104 is operably configured to couple with the container body 102. In one embodiment, the container top 104 is operable to be secured with the container body 102 in a watertight configuration through use of a threaded configuration. In other embodiments, the container top 104 and container body 102 may be engaged utilizing a tongue-and-groove configuration, that may employ the use of a polymeric seal, or another coupling configuration where the container top 104 is securely retained thereto, i.e., having a retained configuration. As used herein, the term "wall" is intended broadly to encompass continuous structures, as well as, separate structures that are coupled together so as to form a substantially continuous external surface.

The container top 104 may also include one or more enclosed straw aperture(s), e.g., aperture 200, that provide a means for the flexible straw assembly 202 to project therethrough. In some embodiments, the straw aperture(s) may be, when a portion of the flexible straw assembly is disposed therein, configured to be watertight or sealed to prevent liquid housed within the container from being inadvertently released when the container is turned over or upside down. The flexible straw assembly 202 is operable to transport a liquid housed in the container cavity 500 to a user, and a priming bulb pump assembly 112 is operable to selectively induce the transportation of the liquid as discussed herein.

Referring to FIGS. 1-3 and FIG. 6, the flexible straw assembly 202 may include a first portion 604 including bottom straw end 204 defining a bottom straw opening 206 disposed proximal (i.e., at or within approximately 2-3 inches) to the bottom wall 106 of the container body 102. The first portion 604 also defines a first enclosed straw channel 300 enabling transport of the liquid housed in the container cavity 500. The flexible straw assembly 202 also includes a second portion 606 including a terminal upper straw end 208, opposing the bottom straw end 204. The second portion 606 also defines an upper straw opening 110 disposed proximal (i.e., at or within approximately 3-4 inches) to an outer surface 304 of the container top 104. The second portion 606 also defines a second enclosed straw channel 302 enabling transport of the liquid housed in the container cavity 500. The flexible straw assembly 202 may collectively define an enclosed straw channel separating the bottom and upper straw ends, whereby liquid is operably configured to be transported from the bottom straw end 204 to the upper straw end 208 with minimal or no leakage.

Figure 5:
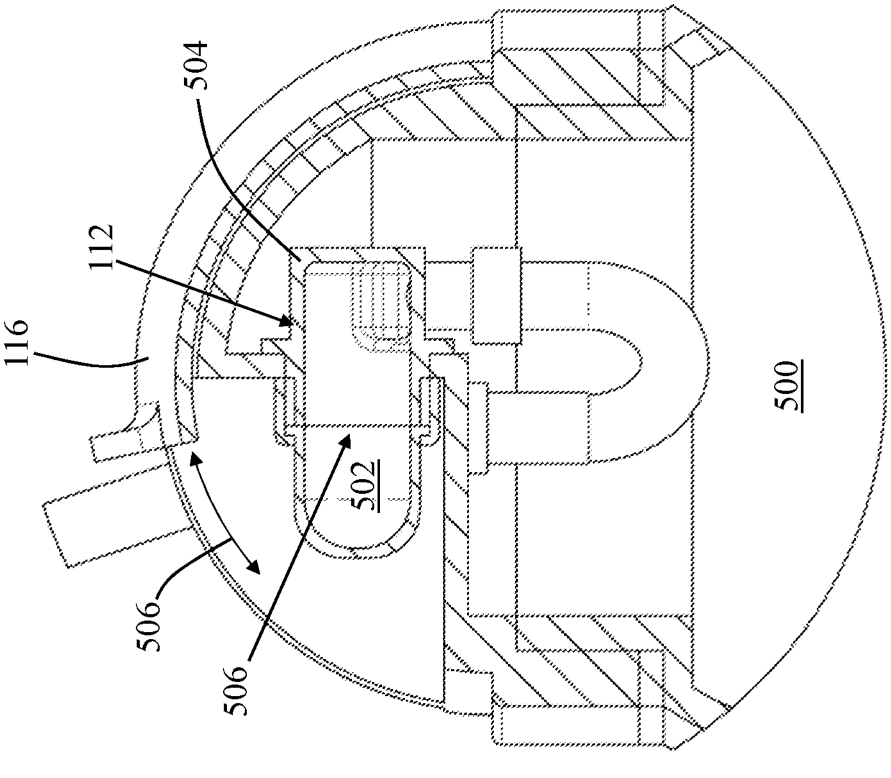
FIG. 5 is a cross-sectional view of the container top of the pump-activated feeding assembly depicted in FIG. 1.

As best seen in FIG. 1 and FIGS. 5-6, the cover 116 may be operably configured to selectively rotate to bend, protect, and encapsulate the second portion 604 of the straw assembly 202, the second portion 604 may be of a flexible polymeric material such as polypropylene or polystyrene. The cover 116 may be coupled to the container top 104 and operably configured to rotate along a cover translation path 506 and have a closed position encapsulating, with the container top 104, the membrane 114 and the second portion 606 of the flexible straw assembly 202. The cover translation path 506 also includes an open position along the cover translation path 506 exposing the membrane 114 and the second portion 606 of the flexible straw assembly 202 to the ambient environment. Said another way, movement of the cover 116 to the open position enables the second portion 604 of the straw assembly and the priming bulb pump assembly 112 to be easily accessible to the user.

Figure 4:
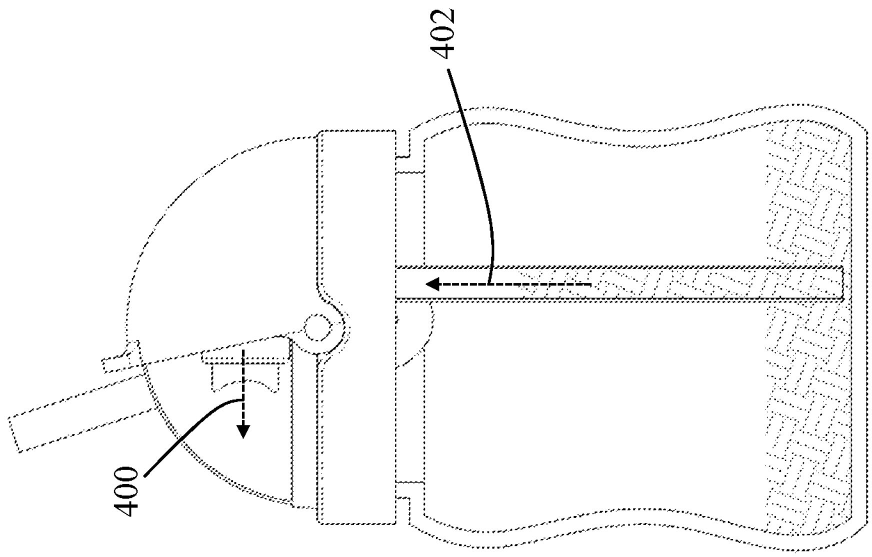
FIG. 4 is a side elevational view of another membrane depression translation path of the pump-activated feeding assembly depicted in FIG. 1.
Figure 3:
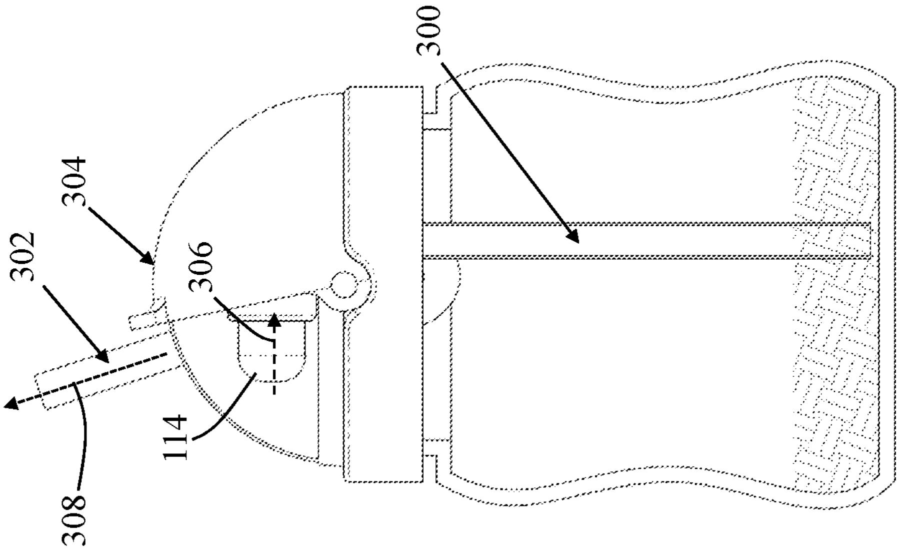
FIG. 3 is a side elevational view of a membrane depression translation path of the pump-activated feeding assembly depicted in FIG. 1.

Referring to FIG. 1, FIG. 3, and FIGS. 5-6, the priming bulb pump assembly 112 includes a flexible and elastically deformable membrane 114 defining a membrane cavity 502. Beneficially, the membrane 114 is operably configured to have a membrane depression translation path 306 (represented in FIG. 3) inducing a pressurized flow (represented with arrow 308) of liquid through the second enclosed straw channel 302 and the upper straw opening 110. The membrane 114 is also operably configured to have a membrane release translation path 400 (represented in FIG. 4) inducing a vacuum and flow (represented with arrow 402) of liquid through the first enclosed straw channel 300 and the upper straw opening 110.

The priming bulb pump assembly 112 may include a housing 504 defining a front enclosed aperture 506, wherein the flexible and elastically deformable membrane 114 may be hermetically sealed or in a watertight seal to the housing 504. The membrane 114 may also superimpose the front enclosed aperture 506. The housing 504 may be directly coupled to the container assembly in a watertight configuration, through use of one or more fastener(s), such as adhesive. In one embodiment, the membrane 114 of the priming bulb pump assembly 112 is beneficially positioned on the outer surface of the sidewall 108 of the container body 102 or oriented outwardly on a sidewall 612 of the container top 104 for easy access by a user's finger(s) when grasping the container body 102. To facilitate in holding onto (and potentially utilizing) the container body 102 with a single hand of the user, the container body 102 may include one or more friction-inducing panel(s) 626.

When in the static position, a membrane cavity 502 defined by the membrane 114 may have a volume of approximately 0.04-1in$^3$. In other embodiments, the internal volume may be outside of said range. In some embodiments, a lever-actuated piston-pump assembly, utilizing a translatable prime mover to induce the flow housed fluid, may be utilized in lieu of the priming bulb assembly 112. In one embodiment, the membrane 114 may be of a flexible and elastically deformable polymeric material, e.g., PVC, HDPE, or polypropylene. The second straw portion 604 or the straw assembly 202 may include a one-way valve disposed therein to effectuate transfer from the inside of the container to the terminal second straw end 208.

When desired for use, a user will place the terminal second straw end 208 proximal to, at, or within the user's mouth, e.g., a child. Then, a user will depress the membrane 114 with approximately 0.25-3 *lbf*, thereby deforming it and placing it in the deformed position (shown best in FIG. 4), to reduce the internal volume 502 within the priming bulb pump assembly 112. The membrane 114 may also be elastic or resilient in nature, such that when the user releases the force applied to the membrane 114, a vacuum is induced within the first straw portion 604 defining the enclosed straw channel 300, thereby receiving liquid housed in the container body 102 and, should there be in any fluid housed within the cavity 502 defined by the priming bulb pump assembly 112, forces said fluid in the priming bulb pump assembly 112 through the channel defined by the second straw portion 604 and out through the upper straw opening 110 defined by the terminal upper straw end 208. Said another way, the priming bulb pump assembly 112 is operably configured to selectively emit a desired quantity of housed liquid within the container body 102 to a receiving user. The user will continue to manually and selectively depress/release the membrane 114 of the priming bulb pump assembly 112 based on a measured dosage or desired amount of liquid he or she wants to emit from the upper straw opening 110. Beneficially, when it is not desirable to feed the receiving user manually, the container assembly 100 can be utilized conventionally, whereby a receiving user applies a suction force on the terminal upper straw end 208 to remove housed fluid inside the container body 102. Manual removal of liquid housed within the container cavity 500 is beneficially effectuated by the one-way check valves 608, 610 beneficially disposed within the liquid flow channel, flanking, and disposed upstream and downstream of the priming bulb pump assembly 112.

In one embodiment, the membrane depression translation path 306 (represented in FIG. 3) solely induces the pressurized flow of liquid through the second enclosed straw channel 302 and the upper straw opening 110. In contrast, a membrane release translation path 400 (represented in FIG. 4) solely induces the vacuum and flow of liquid through the first enclosed straw channel 300 and, correspondingly, the membrane cavity 502. In some embodiments, the housing 504 includes an entrance port 210 and an exit port 212 shaped and sized to be received within the container top 104. The container top 104 may also include a sidewall 612 defining an enclosed bulb aperture 614 with the housing 504 disposed therein, a lower wall 614 defining a first port aperture and a second port aperture shaped and sized to receive an entrance port 210 and an exit port 212, respectively, of a housing 504 of the priming bulb pump assembly 112. The housing 504 may be received in the bulb aperture 614, wherein the membrane 114 is placed over the aperture 502 defined by the housing 504 and held in place by a retaining cap 624.

The membrane depression translation path 306 also includes the membrane cavity 502, the exit port 212, the enclosed straw aperture 200, the second enclosed straw channel 302, and the terminal upper straw end 208 fluidly coupled with one another and the enclosed straw aperture 200 fluidly uncoupled with the first enclosed straw channel 300, the bottom straw opening 206, and the container cavity 500. Said another way, the membrane release translation path 400 includes with the membrane cavity 502, the entrance port 210, the first enclosed straw channel 300, the bottom straw opening 206, and the container cavity 500 fluidly coupled with one another and the membrane cavity 502 fluidly uncoupled with the enclosed straw aperture 200, the second enclosed straw channel 302, and the terminal upper straw end 208. To accomplish the same, the assembly 100 may include one or more one one-way check valve(s).

In one embodiment, a first one-way check valve 608 is at least partially disposed within the first enclosed straw channel 300 and may be directly coupled to the upper end of the straw portion 604 and the entrance port 210. A second one-way check valve 610 may also be at least partially disposed within the second enclosed straw channel 302 and may be directly coupled to the exit port 212. To effectively transport the pressured liquid from the priming bulb pump assembly 112 to the distal opening 110 of the straw portion 606, the second portion 606 may include a U-shaped portion. The first and second one-way check valves 608, 610 may be coupled to the first portion 604 and second portion 606, respectively, of the flexible straw assembly 202 in parallel flow orientations, i.e., the first and second one-way check valves 608, 610 only permits flow of fluid downstream from the lower opening 206 to the upper opening 110. In some embodiments of the present invention, the priming bulb pump assembly 112 may employ the use of an internal flapper having a formed internal flapper channel and valve disposed therein, instead of one-way valves. In said embodiment, the membrane depression translation path 306 would include opening the formed internal flapper channel and valve to allow liquid housed in the membrane cavity 502 to flow therethrough and upward toward the distal opening 110. When placed in the membrane release translation path 400, a vacuum is generated within the membrane cavity 502, thereby closing the formed internal flapper channel and valve and causing the flapper to translate and open the flow of liquid from the container cavity, through the first straw portion 604, an outside surface of the flapper, and into the membrane cavity 502.

As best seen in FIGS. 1-2 and FIGS. 5-6, the container top 104 includes a sidewall 612 defining an enclosed bulb aperture 614 with the housing 504 disposed therein. Also, the container top 104 includes a lower wall 614 defining the first port aperture and the second port aperture shaped and sized to receive the entrance port 210 and the exit port 212, respectively, of a housing 504 of the priming bulb pump assembly 112. The container top 104 also includes a straw channel 616 with the second portion 606 disposed therein.

Although a specific order of executing the process steps as been described, the order of executing the steps may be changed relative to the order shown in certain embodiments. Also, two or more steps described above may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A pump-activated feeding container comprising:

a handheld container body having a bottom wall and a sidewall surrounding the bottom wall, the sidewall:

having an upper end defining an upper aperture;

defining, with the bottom wall, a container cavity;

a container top operably configured to removably couple with the upper end of the sidewall in a retained configuration, the container top having an enclosed straw aperture;

a flexible straw assembly with a first portion including bottom straw end defining a bottom straw opening disposed proximal to the bottom wall of the container body and defining a first enclosed straw channel and a second portion including a terminal upper straw end, opposing the bottom straw end, defining an upper straw opening disposed proximal to an outer surface of the container top, and defining a second enclosed straw channel; and a priming bulb pump assembly directly coupled to at least one of the container body and container top in a watertight configuration and with a flexible and elastically deformable membrane defining a membrane cavity, the membrane operably configured to have:

a membrane depression translation path inducing a pressurized flow of liquid through the second enclosed straw channel and the upper straw opening; and a membrane release translation path inducing a vacuum and flow of liquid through the first enclosed straw channel and the upper straw opening.

2. The pump-activated feeding container according to claim 1, wherein the the membrane depression translation path solely induces the pressurized flow of liquid through the second enclosed straw channel and the upper straw opening and the membrane release translation path solely induces the vacuum and flow of liquid through the first enclosed straw channel.

3. The pump-activated feeding container according to claim 1, wherein the housing further comprises:

an entrance port and an exit port, the membrane depression translation path includes the membrane cavity, the exit port, the enclosed straw aperture, the second enclosed straw channel, and the terminal upper straw end fluidly coupled with one another and the enclosed straw aperture fluidly uncoupled with the first enclosed straw channel, the bottom straw opening, and the container cavity.

4. The pump-activated feeding container according to claim 3, wherein:

the membrane release translation path includes with the membrane cavity, the entrance port, the first enclosed straw channel, the bottom straw opening, and the container cavity fluidly coupled with one another and the membrane cavity fluidly uncoupled with the enclosed straw aperture, the second enclosed straw channel, and the terminal upper straw end.

5. The pump-activated feeding container according to claim 4, further comprising:

a first one-way check valve at least partially disposed within the first enclosed straw channel; and a second one-way check valve at least partially disposed within the second enclosed straw channel.

6. The pump-activated feeding container according to claim 5, wherein:

the first and second one-way check valves are coupled to the first portion and second portion, respectively, of the flexible straw assembly in parallel flow orientations.

7. The pump-activated feeding container according to claim 1, wherein the priming bulb pump assembly further comprises:

a housing defining a front enclosed aperture, the flexible and elastically deformable membrane hermetically sealed to the housing and superimposing the front enclosed aperture.

8. The pump-activated feeding container according to claim 7, wherein the container top further comprises:

a sidewall defining an enclosed bulb aperture with the housing disposed therein, a lower wall defining a first port aperture and a second port aperture shaped and sized to receive an entrance port and an exit port, respectively, of a housing of the priming bulb pump assembly, and a straw channel with the second portion disposed therein.

9. The pump-activated feeding container according to claim 8, further comprising:

a cover selectively rotatably coupled to the container top and operably configured to rotate along a cover translation path and have a closed position encapsulating, with the container top, the membrane and the second portion of the flexible straw assembly and an open position along the cover translation path exposing the membrane and the second portion of the flexible straw assembly to the ambient environment.

10. A pump-activated feeding container comprising:

a handheld container body having a bottom wall and a sidewall surrounding the bottom wall and having an upper end defining an upper aperture and with sidewall threads disposed thereon, the sidewall and bottom wall defining a container cavity;

a container top with top threads operably configured to selectively removably engage in a locked relationship with the sidewall threads, the container top having an enclosed straw aperture;

a flexible straw assembly with a first portion including bottom straw end defining a bottom straw opening and defining a first enclosed straw channel and a second portion including a terminal upper straw end, opposing the bottom straw end, defining an upper straw opening and defining a second enclosed straw channel;

a first one-way check valve and a second one-way check valve; and a priming bulb pump assembly directly coupled to at least one of the container body and container top in a watertight configuration, with an entrance port directly coupled to the first portion of the flexible straw assembly through the first one-way check valve, an exit port directly coupled to the second portion of the flexible straw assembly through the second one-way check valve, and a flexible and elastically deformable membrane defining a membrane cavity, the membrane 114 operably configured to have:

a membrane depression translation path inducing a pressurized flow of liquid through the second enclosed straw channel and the upper straw opening; and a membrane release translation path inducing a vacuum and flow of liquid through the first enclosed straw channel and the upper straw opening.

11. The pump-activated feeding container according to claim 10, wherein:

the bottom straw opening is disposed proximal to the bottom wall of the container body and the upper straw opening is disposed proximal to an outer surface of the container top.

12. The pump-activated feeding container according to claim 11, wherein:

the membrane depression translation path solely induces the pressurized flow of liquid through the second enclosed straw channel and the upper straw opening and the membrane release translation path solely induces the vacuum and flow of liquid through the first enclosed straw channel and the upper straw opening.

13. The pump-activated feeding container according to claim 12, wherein:

the membrane depression translation path includes the membrane cavity, the exit port, the enclosed straw aperture, the second enclosed straw channel, and the terminal upper straw end fluidly coupled with one another and the enclosed straw aperture fluidly uncoupled with the first enclosed straw channel, the bottom straw opening, and the container cavity.

14. The pump-activated feeding container according to claim 13, wherein:

the membrane release translation path includes with the membrane cavity, the entrance port, the first enclosed straw channel, the bottom straw opening, and the container cavity fluidly coupled with one another and the membrane cavity fluidly uncoupled with the enclosed straw aperture, the second enclosed straw channel, and the terminal upper straw end.

15. The pump-activated feeding container according to claim 14, wherein:

the first and second one-way check valves are coupled to the first portion and second portion, respectively, of the flexible straw assembly in parallel flow orientations.

16. The pump-activated feeding container according to claim 15, wherein the priming bulb pump assembly further comprises:

a housing defining a front enclosed aperture, the flexible and elastically deformable membrane hermetically sealed to the housing and superimposing the front enclosed aperture.

17. The pump-activated feeding container according to claim 16, wherein the container top further comprises:

a sidewall defining an enclosed bulb aperture with the housing disposed therein, a lower wall defining a first port aperture and a second port aperture shaped and sized to receive an entrance port and an exit port, respectively, of a housing of the priming bulb pump assembly, and a straw channel with the second portion disposed therein.

18. The pump-activated feeding container according to claim 17, further comprising:

a cover selectively rotatably coupled to the container top and operably configured to rotate along a cover translation path and have a closed position encapsulating, with the container top, the membrane and the second portion of the flexible straw assembly and an open position along the cover translation path exposing the membrane and the second portion of the flexible straw assembly to the ambient environment.

* * * * *